Figure 1:
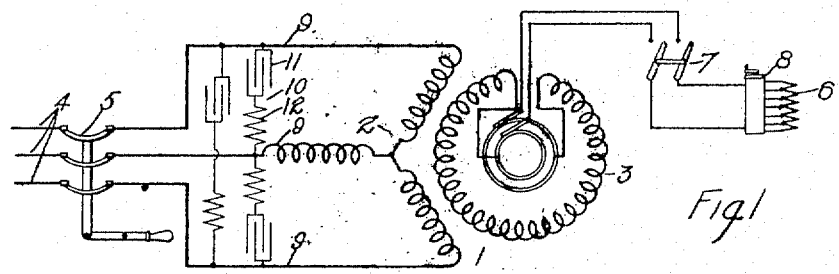

L. W. CHUBB.
PROTECTIVE SYSTEM FOR ELECTRICAL APPARATUS.
APPLICATION FILED JAN. 5, 1916.

1,255,387.

Patented Feb. 5, 1918.

WITNESSES:
Clarence B. Myers.
Geo. W. Hansen.

INVENTOR
Lewis W. Chubb.
BY
Wesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

PROTECTIVE SYSTEM FOR ELECTRICAL APPARATUS.

1,255,387. Specification of Letters Patent. Patented Feb. 5, 1918.

Application filed January 5, 1916. Serial No. 70,414.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Protective Systems for Electrical Apparatus, of which the following is a specification.

My invention relates to a method of, and means for, protecting electrical devices, such as induction motors, transformers and the like from transient disturbances that may be generated within the devices themselves as a result of disconnecting them from their associated power circuits.

More particularly, my invention relates to energy-absorbing means which is adapted to be connected across the terminals of the apparatus to be protected and is inserted in the associated circuit between the disconnecting switch and the said apparatus.

When inductive devices of high-power capacity are disconnected from the conductors of a distributing circuit, high-voltage impulses may be generated within the devices themselves as a result of the collapse of their magnetic fields. In inductive devices having air gaps, such as induction motors and particularly those having wound rotors, the high-voltage impulses occasioned when the induction motors are disconnected from circuit may be of sufficient potential to damage the insulating properties of the motors or cause flash-overs on the disconnecting switches. Inductive devices having air gaps in their magnetic circuits are subject to specially severe stresses on being disconnected from their associated circuits because of the rapid or almost instantaneous collapse of the magnetic fields which results in generating high-voltage and high-frequency impulses by reason of the relatively small inherent electrostatic capacity of the devices.

To absorb the energy of these high-frequency and high-voltage disturbances that may overstrain and impair the insulation of an unprotected device, I propose to permanently connect energy-absorbing circuits across the terminals of the inductive apparatus, such circuits to be inserted between the said apparatus and the disconnecting switch utilized for effecting circuit connections with the distributing system. For instance, in the switching and control operations of an induction motor having a wound rotor, it is desirable to open first the secondary circuit and then the primary circuit of the motor in order that smaller switches may be used for disconnecting the primary winding from circuit. Even though the secondary circuit is opened, high-frequency and high-potential impulses may be generated within the apparatus on disconnecting the primary winding from circuit, which disturbances, in some cases, may break down the insulation of the primary winding or injure the disconnecting switch. These disturbances are usually initiated at a very high frequency that depends upon the relative values of the inductive reactance of the motor winding and the electrostatic capacity of the condensive reactance elements comprised in the energy-absorbing means. It will be apparent, therefore, that such impulses will always have a definite frequency which, on the condition that no absorbing means are supplied, such as I contemplate using in my protective system, is dependent upon the effective inductance of the motor winding and the electrostatic capacity of the motor leads.

In any system affording protection to an electrical inductive device, it is desirable that only small quantities of electrical energy shall be absorbed under normal operating conditions. Frequently, however, the operating power-factor of the system may be sufficiently low to necessitate the use of power-factor correcting means in order to improve the operating efficiency of the system. To this end, my protective system readily lends itself and, at the same time, limits the voltages that may exist at the terminals of a device when such device is disconnected from circuit. Moreover, the rate at which the energy of the disturbances may be dissipated is considerably increased, inasmuch as the energy-absorbing means of my invention greatly enhance the energy-consuming power of the induction-motor windings. Under certain conditions, the electrical constants of the devices employed may be so adjusted that, when normal frequency impulses are impressed upon the terminals of the apparatus to be protected, the energy-absorbing circuits will substantially preclude any current from flowing therethrough.

Figure 2:
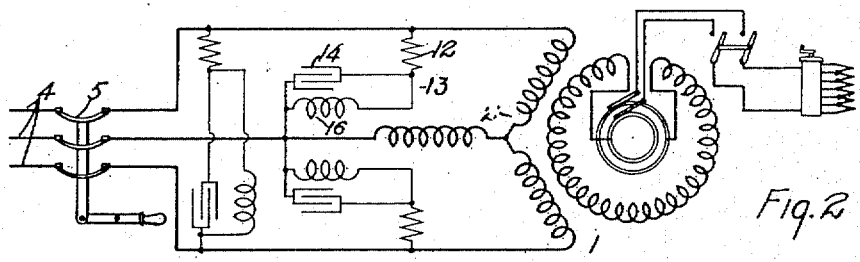
Figure 3:
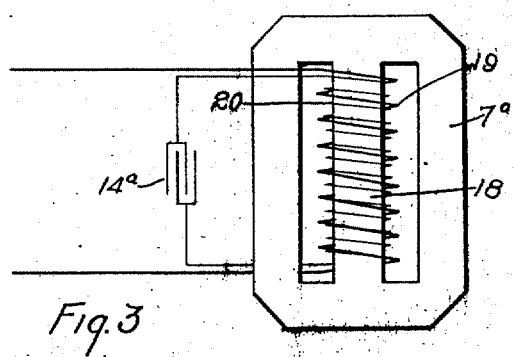

For a better understanding of the nature and scope of my invention, reference may be had to the following description and the accompanying drawing in which Figure 1 is a diagrammatic view showing an induction motor provided with energy-absorbing means of my invention; Fig. 2 is a modified form of the system shown in Fig. 1, and Fig. 3 is a view, in elevation, of a device that may be utilized to furnish the energy-absorbing means shown in Fig. 2.

Referring to Fig. 1, a polyphase induction motor 1 having a stator provided with a Y-connected winding 2 and a rotor provided with a winding 3, is connected to power conductors 4 through a disconnecting switch 5. For adjusting the speed of the motor and in order to obtain proper torque values thereof, a resistor 6 is provided which may be connected in circuit with the winding 3 by means of a switch 7. A manually-operated controller 8 is inserted to vary the circuit connections between various portions of the resistor 6 and the rotor winding 3. Since this form of control is old in the art, the controller 8, its associated connections with the rotor winding 3 and the resistor 6 are shown diagrammatically only, and will not be described further.

As mentioned above, in disconnecting the induction motor 1 from circuit, it is advisable to first open the switch 7 and, subsequently, the switch 5. On opening the switch 5, high-frequency, high-voltage impulses may be generated within the motor 1 by reason of the collapse of the magnetic field common to the stator and the rotor unless provision is made for suppressing and absorbing the energy of these disturbances. I, accordingly, connect an energy-consuming means 10 across the three-phase terminals 9 of the winding 2, each of which comprises a condensive reactance element 11, and, under certain conditions, a non-inductive resistance element 12. The winding 2 has an inherent inductive reactance such as exists in the windings of all induction motors. In consequence thereof, it is preferable to use a condenser 11 of such capacity that it is in parallel resonance with the proper portion of the motor winding 2 at normal frequency in order to correct the power factor of the fundamental component of the motor-exciting current. If a resistance element 12 is made a part of each of the energy-absorbing means 10, a slight energy loss in the system will be effected as a result of the flow of the charging currents of the condensers 11 through the resistors 12. Under normal operating conditions, therefore, it will be noted that the condensive reactance elements 11, in combination with the proper portions of the motor winding 2, establish a plurality of circuits that are in parallel resonance at normal frequency. The energy consumed by reason of the absorbing means 10 will be negligible, and the efficiency of the system will be unaffected. Since the proper portions of the motor winding 2, in combination with the condensive reactance elements 11, provide closed circuits upon opening the switch 5, it is evident that the stored energy within the motor 1 will produce a damped oscillating current at a frequency depending upon the relative values of the inductance of the motor winding and the capacity of the condensers. The rate at which these oscillations are damped depends upon the resistance of the elements 12 and the iron losses in the core members of the motor windings. The condensers 11 limit the voltage that may be impressed upon the terminals 9 of the motor and also the frequency of the disturbances that are generated by reason of the collapse of the magnetic field in the motor when it is disconnected from circuit. By this means, the windings of the induction motor are protected against continuous excessive stresses that usually develop as a result of the sudden discharge of the magnetic energy stored in the motor.

To those versed in the art, it will be apparent that the resistors 12 may be omitted, as hereinbefore mentioned, thereby allowing the oscillations to continue for a longer period of time and the energy of the disturbances to be dissipated in the resistance of the motor windings and in the iron losses of the motor-core members.

In Fig. 2, protection is afforded the induction motor 1 by means of energy-absorbing circuits 13 which constitute parallel resonant circuits for alternating-current impulses of normal frequency. In addition, the energy-absorbing circuits 13, in combination with the proper portions of the motor winding 2, constitute series resonant circuits for impulses of high frequency which are generated when the motor 1 is disconnected from the power conductors 4. The resistors 12 may or may not be connected in circuit, according to whether or not it is desirable to dissipate the energy of the disturbances at higher or lower rates, as mentioned above. For dissipating the energy of high-frequency alternating-current impulses, such as those which are generated when disconnecting the motor 1 from circuit, series resonant circuits of low impedance may be provided if the electrical constants of the condensers 14 are suitably chosen. These series resonant circuits are similar to the oscillating circuits of Fig. 1. In order to preclude the flow of alternating-current impulses of normal frequency through the shunt circuits 13, inductive elements 16 are connected in parallel to the condensers 14, and their reactances are so adjusted that, in combination with the condensers 14, parallel or current resonant paths are established which, when impressed with normal frequency impulses, will act as paths having substantially infinite impedances. By preventing the flow of normal-frequency currents through the shunt circuits 13 in this manner, the values of the resistance of the elements 12 may be made as high as desired without affecting the operating efficiency of the system. At the same time, means are provided for rapidly absorbing the energy of the internal disturbances.

Under usual conditions, it is unnecessary to rapidly dissipate the energy of the disturbances such as are generated on disconnecting induction motors from circuit, but it will be appreciated that circumstances may arise where it is necessary or desirable to rapidly dissipate the energy of such disturbances. To accomplish this, the values of the resistors 12 may be so chosen as to dissipate the energy of the disturbances at very high rates.

In Fig. 3 is shown a device that may be substituted for the means 13 of Fig. 2. A magnetizable core member 7 provides a closed magnetic circuit the central leg 18 of which is embraced by a primary winding 19 of a transformer. A secondary winding 20, closely magnetically linked with the primary winding, is connected in closed-circuit relationship with a condenser 14ª. By properly selecting the value of the capacity of the condenser 14ª and choosing the proper number of turns for the secondary winding 20, a circuit may be established through the primary winding 19 which will be equivalent to the parallel resonant means 13 of Fig. 2.

While I have shown several embodiments of my invention, it will be understood by those skilled in the art that many modifications may be made without departing from the spirit and scope of the appended claims.

I claim as my invention:

1. In an electric circuit, the combination with an inductive winding and means for connecting the winding to the circuit, of an energy-absorbing means permanently connected across the winding, said means being adapted to constitute a parallel-resonant path for the current of normal frequency traversing the winding, and a series-resonant path for the current having the frequency of the impulse in the winding incident to disconnecting the same from the circuit.

2. The combination with an inductive winding, of an energy-absorbing means permanently connected across the winding, said means being adapted to constitute a parallel-resonant path for the current of normal frequency traversing the winding and a series-resonant path for current of relatively higher frequencies that are induced in the winding when the same is open circuited.

3. The combination with an inductive winding, of an energy-absorbing means permanently connected across the winding, said means being adapted to preclude the flow of current of the normal frequency therethrough and to permit the flow therethrough of current of relatively higher frequencies that are induced in the winding when the same is open circuited.

4. In an electrical circuit, the combination with an inductive winding, and a switch for varying the connections between the winding and the circuit, of a resistor, a reactor and a condenser permanently connected across the terminals of the winding, said resistor, reactor and condenser being so proportioned and connected that they constitute a parallel-resonant path under normal conditions and a series-resonant path under conditions when the switch is opened.

5. In an electrical circuit, the combination with an inductive winding, and a switch for varying the connections between the winding and the circuit, of a resistor, a reactor and a condenser permanently connected across the terminals of the winding, said resistor, reactor and condenser being so proportioned and connected that they constitute a parallel-resonant path under normal conditions to preclude current from traversing the same and a series-resonant path under conditions when the switch is opened to permit current to traverse the same.

6. The combination with an electrical apparatus having an inherent inductive reactance, of a condenser and a resistor connected in series relationship across the terminals thereof, and a reactor connected in shunt relation to the condenser, said condenser, resistor and reactor being adapted to constitute a parallel-resonant path across the terminals of the apparatus under normal conditions and a series-resonant path to permit the flow of current therethrough of a predetermined relatively high frequency.

7. The combination with an electrical apparatus having an inherent inductive reactance, of a condenser and a reactor connected in series relationship across the terminals thereof, and a reactor connected in shunt relation to the condenser, said condenser, resistor and reactor being so proportioned that current of normal frequency is precluded from traversing the same and currents of a predetermined relatively high frequency only are permitted to traverse the same.

8. The combination with an electrical apparatus comprising an inductive winding, electrical power conductors, and a switch for varying the connection between said apparatus and the power conductors, of an energy-consuming means permanently connected across the said apparatus and constituting a double-resonant path for precluding current of the normal frequency from traversing and for permitting currents of a predetermined relatively high frequency that are generated when the switch is opened to traverse the same.

9. The combination with an electrical apparatus comprising an inductive winding, electrical power conductors, and a switch for operatively connecting the apparatus to the conductors, of energy-absorbing means permanently connected across the said apparatus, said means constituting a parallel-resonant path for alternating-current impulse having the normal frequency of the apparatus to preclude the flow of current therethrough under normal conditions, and a series-resonant path to permit the high-frequency impulses that are generated when the apparatus is disconnected from the power conductors to flow therethrough.

In testimony whereof, I have hereunto subscribed my name this 30th day of Dec., 1915.

LEWIS W. CHUBB.